(12) United States Patent
Gaid

(10) Patent No.: US 7,459,086 B2
(45) Date of Patent: Dec. 2, 2008

(54) METHOD FOR TREATING WATER CONTAINING IRON, MANGANESE AND ARSENIC

(75) Inventor: Abdelkader Gaid, Paris (FR)

(73) Assignee: OTV SA S.A. (FR)

( * ) Notice: Subject to any disclaimer, the term of this patent is extended or adjusted under 35 U.S.C. 154(b) by 421 days.

(21) Appl. No.: 10/513,983

(22) PCT Filed: Apr. 30, 2003

(86) PCT No.: PCT/FR03/01369

§ 371 (c)(1),
(2), (4) Date: Jan. 7, 2005

(87) PCT Pub. No.: WO03/095372

PCT Pub. Date: Nov. 20, 2003

(65) Prior Publication Data

US 2005/0252862 A1 Nov. 17, 2005

(30) Foreign Application Priority Data

May 7, 2002 (FR) .................................. 02 05754

(51) Int. Cl.
*C02F 1/64* (2006.01)
(52) U.S. Cl. .................. 210/667; 210/673; 210/688; 210/722; 210/763; 210/792; 210/912
(58) Field of Classification Search .................. 210/665, 210/667, 673, 681, 688, 722, 763, 792, 912
See application file for complete search history.

(56) References Cited

U.S. PATENT DOCUMENTS

| | | | |
|---|---|---|---|
| 1,990,214 A * | 2/1935 | Zapffe | 210/722 |
| 2,145,901 A | 2/1939 | Shoemaker | |
| 3,167,506 A * | 1/1965 | Fackler et al. | 210/722 |
| 4,551,254 A | 11/1985 | Imada et al. | |
| 4,565,633 A * | 1/1986 | Mayenkar | 210/688 |
| 5,080,808 A * | 1/1992 | Kim et al. | 210/792 |
| 5,082,570 A * | 1/1992 | Higgins et al. | 210/683 |
| 5,635,073 A | 6/1997 | Aktor et al. | |
| 7,273,556 B2 * | 9/2007 | Lefort | 210/665 |
| 2003/0089665 A1 * | 5/2003 | Shaniuk | 210/668 |

FOREIGN PATENT DOCUMENTS

| | | |
|---|---|---|
| GB | 471 277 | 9/1937 |
| GB | 1 361 827 | 7/1971 |

* cited by examiner

Primary Examiner—Matthew O Savage
(74) Attorney, Agent, or Firm—Coats & Bennett, P.L.L.C.

(57) ABSTRACT

A method for treating water to produce potable water is described herein. The inventive method enables the efficient removal of iron, manganese, and arsenic without the addition of powerful oxidants and without requiring a complex procedure for preparing the filtering material. The described method treats the water by passing the water through at least one bed of filter material, where the filter material comprises an association of manganese dioxide grains and at least one iron-based divided material in the hydroxide, oxide, or metallic state. The association may comprise a mixture of the iron-based divided material and the manganese dioxide grains. Alternatively, the association may comprise a superposition of layers of the iron-based divided material and the manganese dioxide grains.

26 Claims, 1 Drawing Sheet

METHOD FOR TREATING WATER CONTAINING IRON, MANGANESE AND ARSENIC

Figure 1:
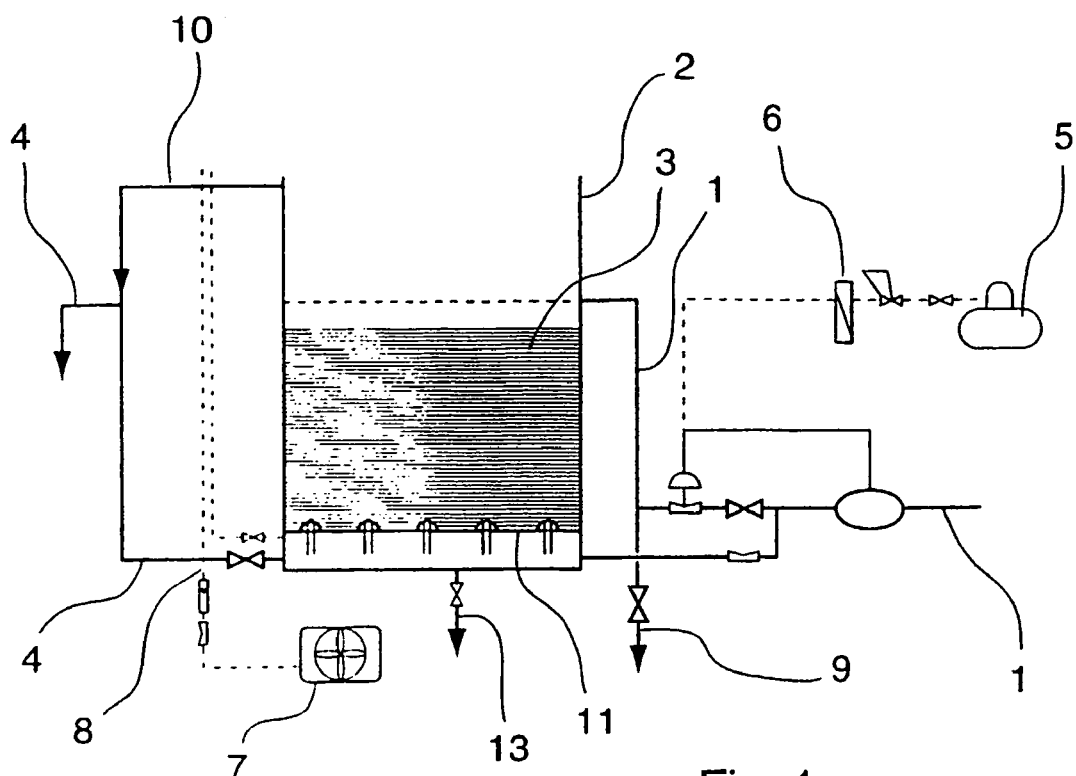

The present invention relates to a method for treatment of water. More precisely, the invention relates to a process of making waters intended for human consumption drinkable, by reducing iron, manganese and arsenic.

The principle of elimination of iron depends on its oxidation and on the retention of the insoluble oxides thus formed ($Fe(OH)_3$, $Fe_2O_3$). Oxidation with oxygen, or with chemical oxidants which may be considered such as chlorine, chlorine dioxide, potassium permanganate or ozone, is necessary to attain sufficient oxidation-reduction potentials. The oxidant most currently used in this context is potassium permanganate.

The principle of elimination of arsenic depends on its chemical oxidation and its adsorption on insoluble metallic hydroxides (iron or aluminum in general).

The traditional physicochemical method of manganese and iron removal from waters consists of chemically oxidizing the manganese and/or the iron contained in them by means of potassium permanganate, chlorine or ozone, then filtering them on a granular material such as sand, for example. This can become coated with precipitates of manganese dioxide at the end of several months and form a so-called natural "greensand". This "greensand" can likewise be prepared by depositing beforehand a film of hydrated manganese dioxide on the surface of a support which may be sand, acid clay, anthracite, zeolite, a dolomitic material, etc. The manganese dioxide is then considered as playing the part of a catalyst.

This type of method has the major disadvantage of necessitating the addition at the beginning of a powerful oxidant such as potassium permanganate, free chlorine, or ozone.

A granular material can also be prepared starting from a mainly inert material. Combined with finely divided manganese dioxide and/or an oxide of iron ($Fe_3O_4$, for example), the whole is bound by a cement in order to obtain granules of 10-60 mesh size, such as described in the patents U.S. Pat. No. 2,145,901 and GB 471 277.

This type of method does not require the addition of oxidant. On the other hand, it requires the specific manufacture of the granular material, entailing particular equipment to do this and the consequential investment, to which has to be added the cost of preparing the granular material.

The invention has particularly as its object to remedy the disadvantages or deficiencies of the prior art.

More precisely, the object of the invention is to propose a physicochemical water treatment method enabling efficient removal of iron, manganese and arsenic contained in waters, without the addition of powerful oxidants.

The invention also has the object of providing such a method for which the preparation of the filtering material is appreciably simplified with respect to the prior art.

The invention also has the object of providing such a physicochemical method which uses a filtering material not requiring chemical regeneration, particularly by an oxidant.

Another object of the invention is to propose such a method for water treatment which gives rise to no, or very small, loss of filtering material.

Another object of the invention is to propose such a method which makes use of a filtering material which may be a residue directly from the mining industry, for example, requiring only a simple mechanical treatment before use.

Yet another object of the invention is to provide such a water treatment method which may be used on waters having variable and seasonal dissolved contents of iron, manganese and arsenic.

The invention also has the object of proposing such a method which is economical and simple to use.

These objects, as well as others which will become apparent in what follows, are attained by means of a water treatment method in order particularly to reduce the content of iron, manganese and arsenic, characterized in that it comprises a step of causing the said waters to pass over at least one bed of filtering materials comprising an association:

of at least one divided material based on iron oxide or hydroxide, or iron in the metallic state, in the form of particles of dimensions 0.3-2 mm;

of grains of manganese dioxide having an apparent density of the order of 2 and hardness greater than 6 on Moh's scale.

It will be noted that in the context of the present description "apparent density of the order of 2" denotes a density which may vary from 1.7 to 2.3.

According to the invention, the iron-based divided material used may therefore be metallic iron (valence equal to 0) or iron oxide or hydroxide. In the first case, it may be in the form of iron filings, chips, foils, etc. In the second case, grains of ferric or ferrous hydroxide may be concerned.

Such an association of iron and manganese dioxide could be in the form of a mixture of iron-based divided material and grains of manganese dioxide, but also in the form of a superposition of layer(s) of iron-based divided material and layer(s) of manganese dioxide grains. In the latter case, the iron-based layer of divided material is preferably in the upper position, while the layer of manganese dioxide grains is preferably in the lower position.

When a layer of grains of ferric hydroxide and a layer of grains of manganese dioxide is used, the layer of ferric hydroxide will advantageously have an apparent density of the order of 1.2-1.5.

The chosen specifics of density and hardness of such materials enable two uniform, stable layers of manganese dioxide and ferric or ferrous hydroxide to be maintained. More precisely, the hardness greater than 6 on Moh's scale of the manganese dioxide grains enables the initial particle size distribution and the initial adsorption capacity of the material to be maintained. Because of this, a negligible or zero consumption of the materials is found, giving a particularly advantageous result connected to the fact that that the materials are not constituted as consumables.

The principle of the invention is thus based, for the elimination of iron, arsenic and manganese, on the use of an association of iron-based divided material and on manganese dioxide grains, with a density and hardness enabling manganese to be retained without the addition of oxidant, and without having to effect a chemical regeneration of the materials by means of an oxidant compound.

Such a method enables waters loaded with iron, manganese and arsenic to be efficiently treated by means of these two materials, chosen for their characteristics and properties. The addition of strong oxidants such as potassium permanganate, free chlorine, or ozone is not necessary, whether for the reduction of the iron, manganese and arsenic content of the waters, or for the regeneration of the filtering material; this is in opposition to current practice.

Furthermore, the method according to the invention is found to be particularly effective without its being necessary to provide the specific preparation of the filtering material consisting of coating, using a cement, an inert material with grains of manganese dioxide as is the case in the prior solutions.

According to a noteworthy characteristic, when the iron-based divided material used is iron hydroxide, this acts as an adsorbent.

According to another noteworthy characteristic, the manganese dioxide chosen by the Applicant acts as a catalyst, and also as an oxidant. The principle of its catalytic activity is similar to that of the catalytic effect obtained with a manganese-treated sand ("greensand"), to which is added the capability of the material for acting as a support for the adsorption of manganese dissolved in the water.

Furthermore, manganese dioxide has an oxidant action for dissolved manganese present in the water to be treated.

It will furthermore be noted that this manganese dioxide is not selective for manganese, and also oxidizes iron, arsenic and selenium. The $Mn^{2+}$ and $Fe^{2+}$ ions are oxidized by $MnO_2$, and are deposited on the surface of the grains of the filtering material.

The overall oxidation-reduction reaction taking place at the surface of the material at the solid-liquid interface, leads to the formation of manganese sesquioxide, $Mn_2O_3$ (solid), both by oxidation of the dissolved manganese and by reduction of solid manganese dioxide. The $Mn_2O_3$ thus produced progressively coats the grains of material.

According to an advantageous solution, the method comprises, when necessary, a step of regeneration of the said filter bed, performed by simple washing by means of a stream of water and/or of a gaseous fluid such as air.

This regeneration step could be performed periodically, in particular taking account of the volumes of water treated and the seasonal variation of their manganese concentration.

According to another embodiment, the said regeneration step could also be performed when the said filtering material bed reaches a predetermined loss of load.

Monitoring, continuously or by sampling, of the residual manganese concentration of the treated water may indicate a loss of load of the filtering material and bring about a decision to regenerate the filter bed.

According to a first embodiment of the regeneration step, the said washing is performed counter-current to the flow of water to be treated within the said filter bed.

According to a second embodiment of the regeneration step, the said washing is effected co-current with the flow of water to be treated within the said filter bed.

According to a preferred solution, the iron-based divided material and/or the said manganese dioxide grains are associated with at least one other material chosen from among the following materials:

sand, anthracite, grains of active carbon, neutralizing material.

Advantageously, the method comprises a preliminary step of crushing and screening the manganese dioxide so as to obtain a particle size of 0.3-1 mm.

It will be noted that, according to other embodiments which may be envisaged, the crushing and screening could vary in order to obtain a different particle size according to the desired filtration.

The method preferably includes a supplementary step of pH adjustment of the said water by a treatment with air, caustic soda, or lime water, upstream of the filtration step.

The said association advantageously comprises by volume, 5%-95% of iron-based divided material and 95%-5% of manganese oxide grains.

The said association preferably comprises about 70% of iron-based divided material and about 30% of manganese dioxide grains, According to an embodiment, the said step consisting causing the water to pass through at least one filtering material bed is performed at atmospheric pressure, but this step could alternatively be performed under pressure, according to another embodiment.

The said step advantageously consisting of passing said water over at least one bed of filtering material is performed with a contact time of 30 seconds to 10 minutes.

The method may be used either by means of filters operating at atmospheric pressure, or by means of filters operating under pressure.

Other characteristics and advantages of the invention will more clearly become apparent on reading the following description of several embodiments of the invention, given by way of illustrative examples and without limitation, with reference to the accompanying drawings.

Figure 2:
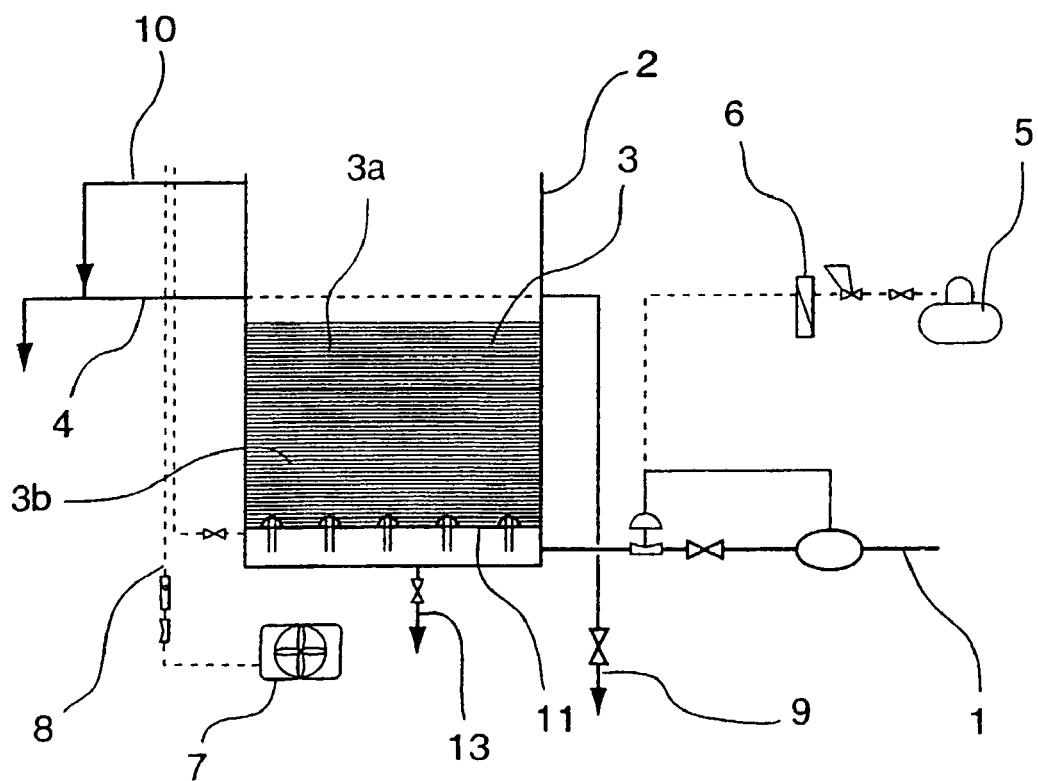

FIG. 1 shows a first embodiment of an industrial unit for removal of iron and manganese and for elimination of arsenic according to the invention, in which the water to be treated ascends through the filter, and FIG. 2 shows a second embodiment of a unit of the same type in which the water descends through the filter.

In the industrial water treatment unit shown schematically in FIG. 1, the water is brought by a duct 1 into the filter 2, which is open in the present case, that is, at atmospheric pressure, but which may be of any other type in other embodiments.

The filter contains a filter bed consisting of a mixture of about 70% by volume of ferric hydroxide grains and about 30% by volume of manganese dioxide grains. It will also be noted that in other embodiments which may be considered, particularly as a function of the iron and manganese contents of the water to be treated, these proportions could for example be reversed. More generally, the bed contains, by volume, 5-95% iron and 95-5% of manganese.

The filter medium 3 is supported by a perforated or fringed floor 11. Furthermore, note that the filter 2 is provided with conventional emptying means 13.

In the case of the open filter shown in FIG. 1, the water flows by gravity through the said filter bed 3 and is collected at the base of the filter by a treated water outlet duct 4. An overflow 10 is provided if needed.

Upstream of the filtration, the water undergoes if necessary a pH adjustment step by air treatment. This adjustment is performed if the pH of the water to be treated is below 7.2. Such an adjustment is performed using an air compressor 5 and an air filter 6 connected to the water input duct 1.

To proceed to filter material regeneration, the unit has a washing air booster 7 connected to a duct 8 opening into the base of the filter 2.

In this manner, the washing air is conveyed at the same time or separately from the washing water, into the filter bed 3, counter-current to the water to be treated. The washing water is collected by a drain duct 9.

To demonstrate the effectiveness of the method according to the invention, used with the unit shown in FIG. 1, the course of the arsenic and manganese contents of the raw water and the treated water was observed for a first application of manganese removal and arsenic elimination in surface water.

In this unit, the contact time of the water with the filtration bed is of the order of 3 minutes. However, in other embodiments, the contact time could be between 30 seconds and 10 minutes, as a function of the required percentage reduction and the desired residual content.

While the manganese content of raw waters varies between 40 and 410 µg/l, the effectiveness of the method is observed with a residual content of the treated water constantly below 10 µg/l, or a reduction of as much as 97.5%.

It is thus clearly shown that the method which has been described enables the reduction of manganese and arsenic content of waters to be treated, which may show considerable seasonal variations.

With results equivalent or superior to those of prior art techniques, the method of using a specific filtering material avoids:

recourse to oxidants, both for the filtration step and for filter bed regeneration;

recourse to an exacting and costly preparation of a filtering material, as is the case for the prior solutions.

Referring to FIG. 2, in which reference numerals identical to those of FIG. 1 denote structural elements identical or similar to those of FIG. 1, the water no longer passes on a descending but on an ascending path through the filter bed. For this purpose, the duct 1 arrives in the lower portion of the filter 2, while the drain duct 4 is provided in its upper portion.

Washing of the filter takes place by co-current injection of air and/or of wash water.

The filter bed 3, composed of an upper layer 3a of ferric hydroxide grains of density about 1.2-1.5 representing about 30% of the total volume of the filter bed 3, and of a lower layer 3b of manganese dioxide grains of density of the order of 4 and of hardness greater than 6 on Moh's scale, representing about 70% of the total volume of the filter bed.

The invention claimed is:

1. A method of treatment of waters, in particular to reduce their iron, manganese and arsenic content,
the method comprising passing the waters over at least one bed of filter material comprising an association
of at least one iron-based divided material in the hydroxide state, the iron-based divided material in the form of particles of dimensions 0.3-2 mm; and
of manganese dioxide grains having an apparent density of the order of 2 and a hardness greater than 6 on Moh's scale.

2. The method according to claim 1 wherein the iron-based divided material used is in the form of grains of ferric hydroxide.

3. The method according to claim 1 wherein the association of iron-based divided material and manganese dioxide comprises a superposition of layers of iron-based divided material and of manganese dioxide grains.

4. The method according to claim 3 wherein the superposition of layers comprises an upper layer of iron-based divided material and a lower layer of manganese dioxide grains.

5. The method according to claim 4 wherein the upper layer of iron-based divided material comprises an upper layer of ferric hydroxide grains.

6. The method according to claim 5 wherein the upper layer of ferric hydroxide grains has an apparent density of about 1.2-1.5.

7. The method according to claim 6 further comprising regenerating the filter material by washing the filter material using at least of a stream of water and a gaseous fluid.

8. The method according to claim 7 wherein the gaseous fluid comprises air.

9. The method according to claim 7 wherein washing the filter material comprises washing the filter material counter-current to the flow of water to be treated within said filter bed.

10. Method according to claim 7 wherein washing the filter material comprises washing the filter material co-current with the flow of water to be treated within said filter bed.

11. The method of claim 7 wherein the regeneration step is performed periodically.

12. The Method according to claim 1 wherein at least one of the iron-based divided material and the manganese dioxide grains are further associated with at least one of sand, anthracite, grains of active carbon, neutralizing material.

13. The method according to claim 1, wherein further comprising a preliminary step of crushing and screening of manganese dioxide to obtain a particle size between 0.3-1 mm.

14. The method according to claim 1 wherein the association of iron-based divided material and manganese dioxide grains comprises by volume between 5%-95% of iron-based divided material and between 95%-5% of manganese dioxide grains.

15. The method according to claim 14 wherein the association of iron-based divided material and manganese dioxide grains comprises by volume about 70% of iron-based divided material and about 30% of manganese dioxide grains.

16. The method according to claim 1 further comprising treating the waters with air upstream of the filtration step to adjust a pH of the said waters.

17. The method according to claim 1 wherein passing the waters over at least one bed of filtering material comprises passing the waters over at least one bed of filtering material at atmospheric pressure.

18. The method according to claim 1 wherein passing the waters over at least one bed of filtering material comprises contacting the waters with at least one bed of filtering material for between 30 seconds 10 minutes.

19. The method of claim 1 including regenerating the filter material by washing the filter material and using at least one of a stream of water and a gaseous fluid.

20. A method of treating waters to produce potable water comprising:

generating a filter comprising an association of manganese dioxide grains and at least one iron-based divided material in the hydroxide state, said manganese dioxide grains having an apparent density on the order of 2 and hardness greater the 6 on Moh's scale; and passing said waters over said filter to generate the potable water.

21. The method of claim 20 wherein said iron-based divided material comprises particles having dimension between 0,3 and 2 mm.

22. The method of claim 20 wherein the association of iron-based divided material and manganese dioxide is present in the form of a superposition of layers of iron-based divided material and of manganese dioxide grains.

23. The method of claim 20 further comprising washing the filter material using at least one of stream of water and gaseous fluid to regenerate the filter material.

24. The method of claim 20 wherein at least one of the iron-based divided material and the manganese dioxide grains are further associated with at least one other of sand, anthracite, grains of active carbon, neutralizing material.

25. The method of claim 20 further comprising treating the water with air upstream of the filtration step to adjust a pH of the waters.

26. The method of claim 20 wherein passing the waters over at least one bed of filtering material comprises contacting the waters with at least one bed of filtering material for between 30 seconds -10 minutes.

* * * * *